United States Patent [19]

Backus et al.

[11] Patent Number: 4,997,123
[45] Date of Patent: Mar. 5, 1991

[54] MULTI-PIECE FLEXURAL PIVOT

[75] Inventors: Robert O. Backus, Mohawk; Daniel J. Salerno, Yorkville; Richard R. Rhymestine, Herkimer; Subhash C. Gupta, New Hartford, all of N.Y.

[73] Assignee: Lucas Aerospace Power Transmission Corp., Utica, N.Y.

[21] Appl. No.: 531,292

[22] Filed: May 31, 1990

[51] Int. Cl.$^5$ ............................................. B23K 1/00
[52] U.S. Cl. .................................. 228/182; 228/189; 228/254; 29/173; 29/436
[58] Field of Search .................. 228/182, 189, 254; 29/173, 436; 267/160; 403/220, 291; 464/51, 100

[56] References Cited

U.S. PATENT DOCUMENTS

| | | | |
|---|---|---|---|
| 3,063,670 | 11/1962 | Young | 267/160 |
| 3,073,584 | 1/1963 | Troeger | 267/160 |
| 3,181,851 | 5/1965 | Troeger | 29/173 |
| 3,319,951 | 5/1967 | Seelig | 267/160 |
| 3,807,029 | 4/1974 | Troeger | 29/436 |
| 3,825,992 | 7/1974 | Troeger | 29/436 |
| 3,844,022 | 10/1974 | Kutash | 29/436 |
| 4,637,596 | 1/1987 | Lewis | 267/160 |
| 4,655,629 | 4/1987 | Flaherty | 267/160 |

Primary Examiner—Sam Heinrich
Attorney, Agent, or Firm—Anthony F. Cuoco

[57] ABSTRACT

A flexural pivot is configured as a multi-piece device which is specifically configured to tolerate vibration and shock loading. The flex pivot described uses preformed unitary (one-piece) support structures which have integral undercut areas, diametrically opposed slots for flexural member placement and key ways and the like, and near net shape geometry. The flexural members are pre-brazed to facilitate the assembly process. The design of the pre-formed support structures eliminates brazed joints which are common locations of fracture due to vibration and shock loading, resulting in a significantly strengthened pivot. The overall configuration and method described provides an economical flex pivot, whereby the flex pivots are accessible for applications which have not heretofore been feasible.

20 Claims, 4 Drawing Sheets

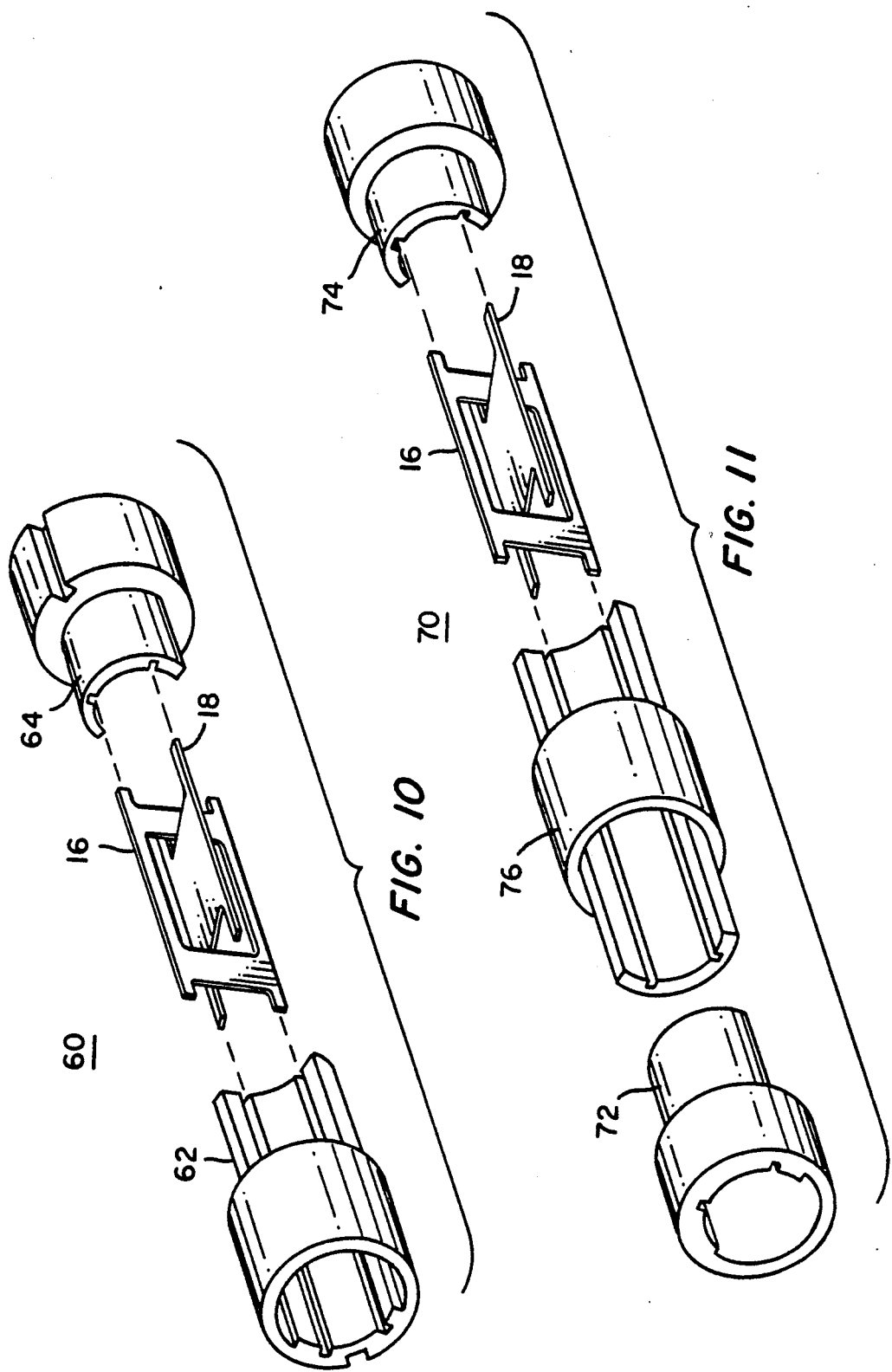

MULTI-PIECE FLEXURAL PIVOT

CROSS-REFERENCE TO RELATED APPLICATIONS

This application is related to U.S. application Ser. No. 202,340 filed on June 6, 1988 by Richard J. Lewis and now on appeal before the Board of Appeals of the U.S. Patent and Trademark Office and U.S. application Ser. No. 345,452 filed on May 1, 1989 by the same inventor and now abandoned.

BACKGROUND OF THE INVENTION

This invention relates generally to flexural pivots and particularly to a multi-piece flexural pivot which is more tolerant to vibration and shock loading than prior art flexural pivots.

Prior art flexural pivots are fabricated by brazing four quadrants, inner and outer flexural members, and a sleeve into a flexural (flex) pivot assembly. The described arrangement has a plurality of brazed joints which are prone to fracture when the pivot is subjected to vibration and shock loading. Failures in which individual quadrants of the four quadrants separate from the flexural members and outer sleeve, or in which the pivot core separates from the outer sleeve, by fracturing at the brazed joints are common.

Another problem encountered with brazed flex pivots using an outer sleeve is a condition called "bridging." Bridging occurs when the braze material used to join the pivot and core to the outer sleeve flows into an undercut area of the pivot and hence prevents flexing.

Flex pivots of the type suffering from these disadvantages are described, for example, in U.S. Pat. Nos. 3,073,584; 3,142,873; 3,142,888; 3,181,851; 3,181,918; 3,319,951; and 3,811,665.

Further, the manufacturing processes for these prior art flex pivots are lengthy and include a variety of expensive, labor intensive operations. The resulting flex pivot has a high cost and a long manufacturing lead time. This prevents the flex pivot from being used in many applications where it would otherwise be advantageous.

SUMMARY OF THE INVENTION

This invention contemplates a multi-piece flex pivot, i.e. a flex pivot including a number of support structures and flexural members, which is specifically configured to be more tolerant of vibration and shock loading than have the prior art flex pivots. The flex pivot described herein uses unitary pre-formed support structures which have integral, matching undercut areas, diametrically opposed slots for supporting flexural members and near net shape geometry, i.e. geometry requiring few, if any, finishing operations to meet specified sizes and tolerances. A configuration of the type described eliminates the need for the prior art four quadrant and sleeve arrangement, and eliminates a significant number of the aforenoted labor intensive operations including assembly and undercutting of the pivot core assembly or sleeve. By eliminating the quadrants and sleeve, the presently disclosed flex pivot eliminates the quadrant/sleeve brazed joints, which are particularly susceptible to fractures, as aforenoted.

BRIEF DESCRIPTION OF THE DRAWINGS

FIG. 10 is an exploded view of a four piece flexural pivot having key ways formed in the two support structures.

FIG. 11 is an exploded view of a double ended flexural pivot formed from five parts.

DETAILED DESCRIPTION OF THE INVENTION

Figure 1:
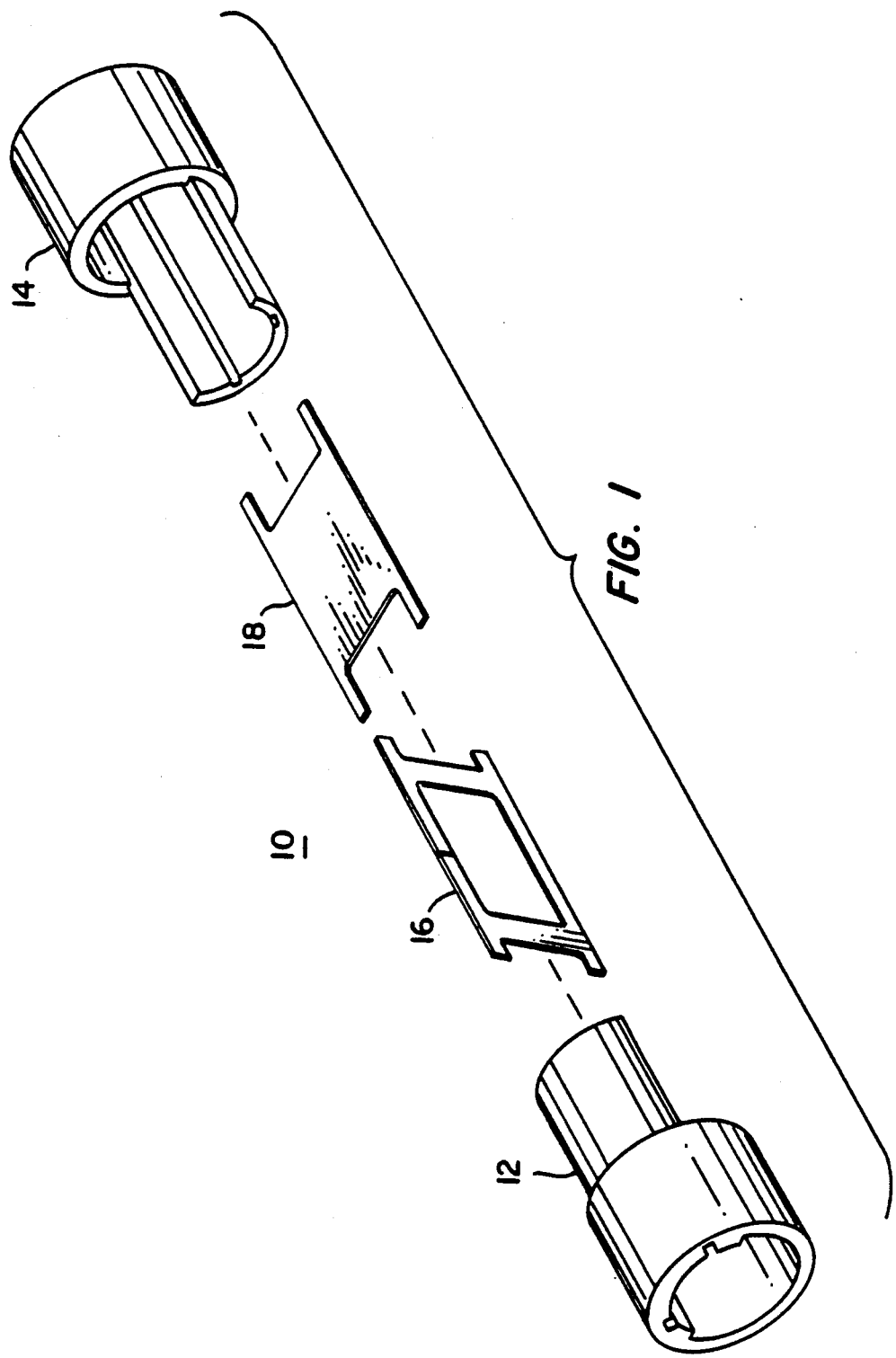
FIG. 1 is an exploded view of a flexural pivot constructed according to the present invention and showing a pair of relatively movable support structures.
Figure 3:
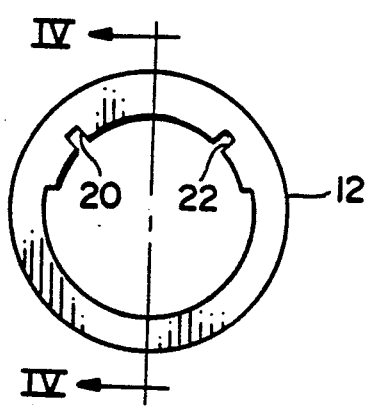
FIG. 3 is an outer end view of the support structure shown in FIG. 2.
Figure 4:
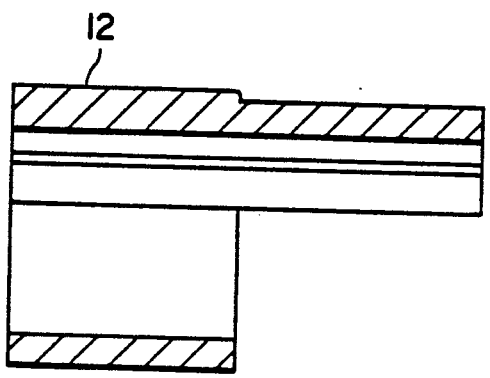
FIG. 4 is a sectional view taken along the line IV—IV in FIG. 3.
Figure 2:
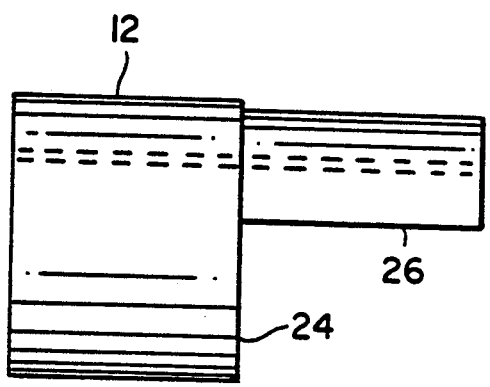
FIG. 2 is a side view of one of the relatively movable support structures shown in FIG. 1.
Figure 5:
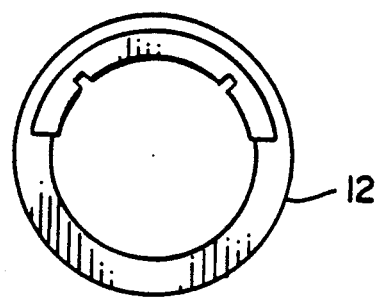
FIG. 5 is an inner end view of the support structure shown in FIG. 2.
Figure 6:
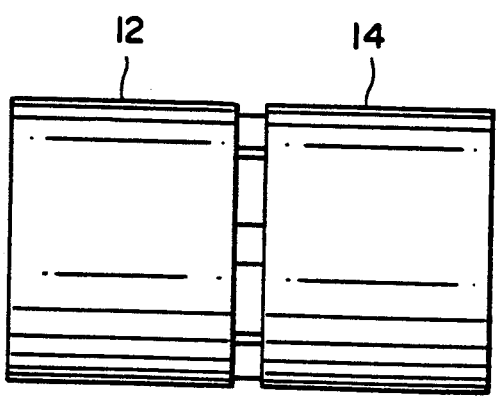
FIG. 6 is a side view of the assembled flexural pivot herein disclosed.

Referring now to the drawings, and to FIGS. 1 through 6 in particular, there is shown a cantilevered flexural pivot 10 constructed according to the teachings of the present invention. Flexural pivot 10 is formed from two support structures 12 and 14 which are resiliently supported with respect to each other by a flat outer spring 16 and a flat inner spring 18. Support structures 12 and 14 are unitary structures having semicircular inner portions extending therefrom and can be assembled to form flexural pivot 10 which has only four pieces.

Support structures 12 and 14 have diametrically opposed internal slots 20 and 22 (FIG. 3) which engage portions of flat springs 16 and 18. Support structure 12 includes a cylindrical outer surrounding portion 24 and an arcuate reduced diameter or undercut portion 26 which, when flex pivot 10 is assembled, extends within mating support structure 14. Support structure 14 likewise has a cylindrical outer portion and a reduced diameter or undercut portion for the same assembled arrangement, as will be discerned from the drawing.

Flat springs 16 and 18 are assembled so that a solid center of spring 18 is disposed within an open center of spring 16 as particularly shown in FIGS. 7–11.

Generally, springs 16 and 18 are aligned perpendicular. While only one type of flexural spring arrangement is shown, it should be noted that many alternate spring arrangements can be used without departing from the spirit and scope of the invention. The angular separation between members 12 and 14 determines the maximum angular displacement through which pivot 10 can be flexed.

Figure 7:
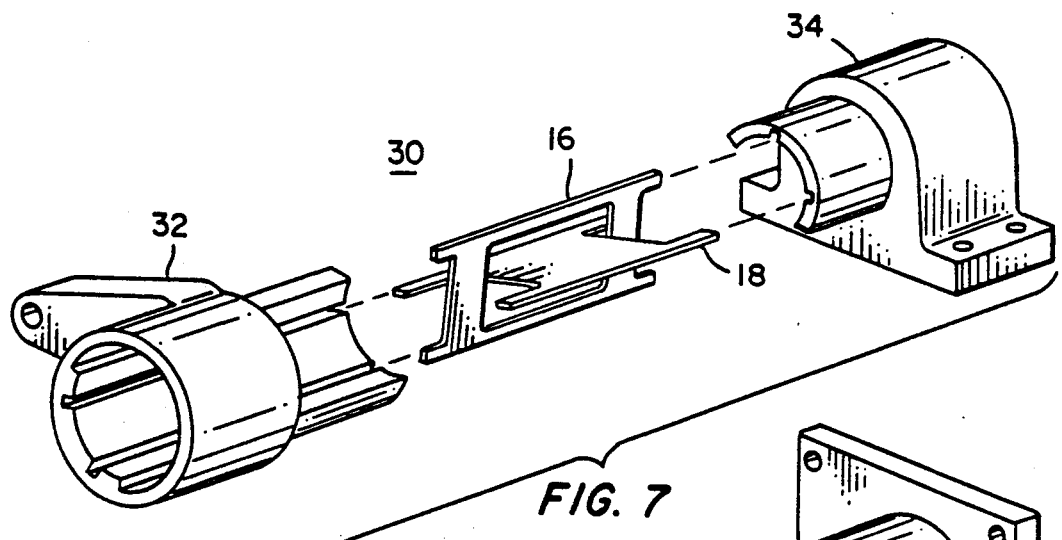
FIG. 7 is an exploded view of a four piece flexural pivot having integrally formed platform and lever support structures.

Referring now to FIG. 7, a flex pivot 30 is shown as having a unitary support structure 34 formed with a platform bottom and a mating unitary support structure 32 formed with an exposed lever.

Figure 8:
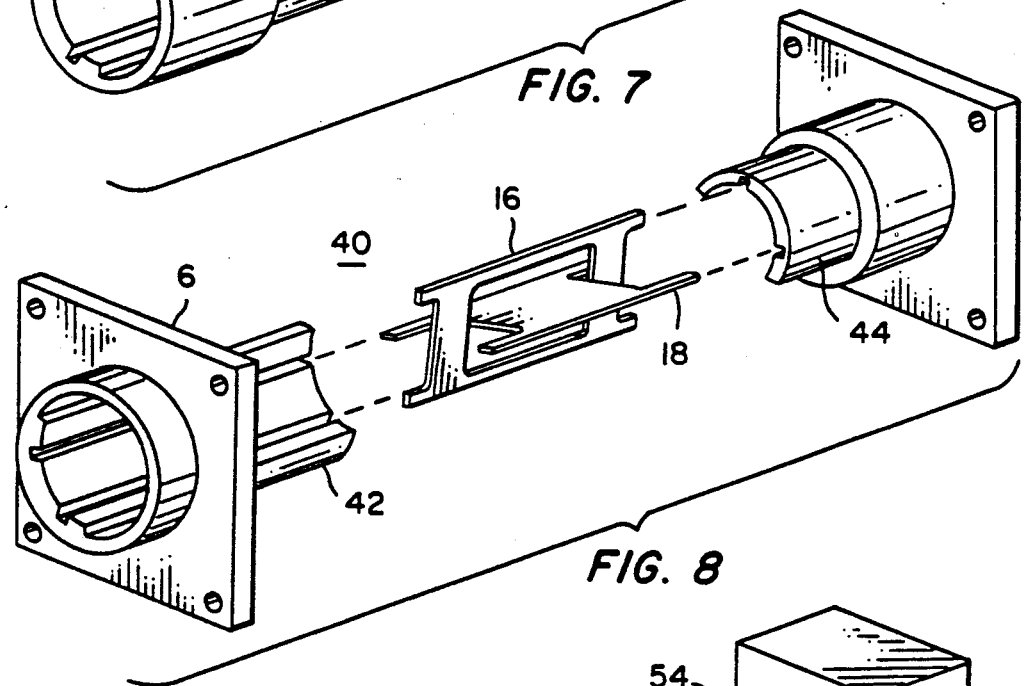
FIG. 8 is an exploded view of a four piece flexural pivot having integrally formed flanged ends.
Figure 9:
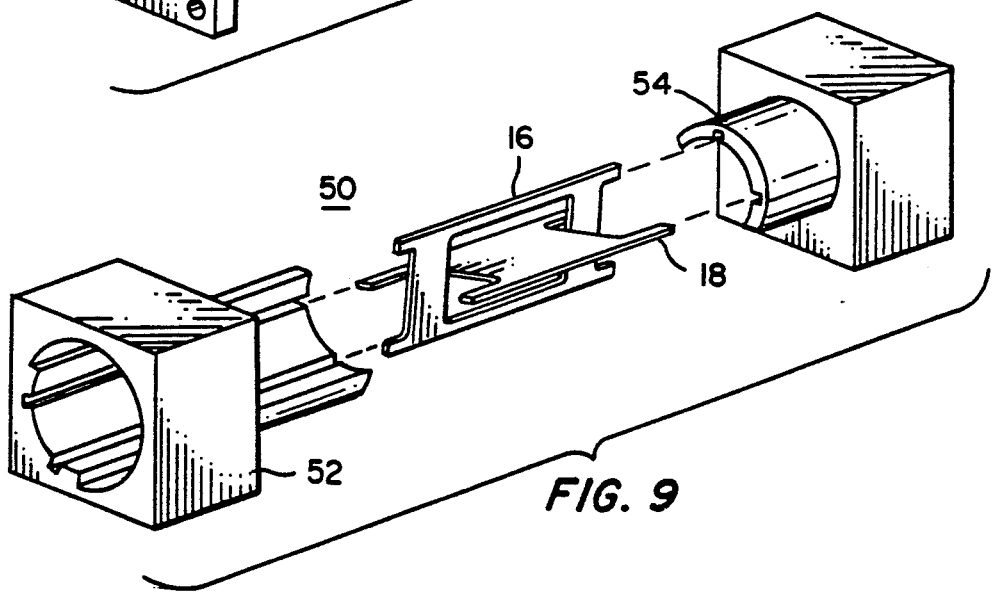
FIG. 9 is an exploded view of a four piece flexural pivot having integrally formed square ends.

Referring now to FIGS. 8, 9 and 10, other flex pivots having other unitary support structures are shown. In FIG. 8 a flanged end plate 6 is shown on support structures 40, 42 of a flex pivot 40. In FIG. 9 square ends are provided on support structures 52, 54 of a flex pivot 50. In FIG. 10 external key way slots are formed in support structures 62, 64 of a flex pivot 60. Thus, the unique and relatively complex shaped support structures of the several flex pivots herein shown allows for predetermined positioning and facilitates use of the pivots in a variety of applications, as has not otherwise been the case.

Referring now to FIG. 11 there is shown a five piece configuration for a flex pivot 70 having unitary support structures 72, 74. Support structures 72, 74 have reduced diameter or undercut portions which project within center structure 76. Springs 16, 18 resiliently support structures 72, 74 with respect to center structure 76. Support structures 72, 74 can be formed with complex shapes as described above with respect to the cantilevered flex pivots shown in FIGS. 7-10.

Support structures 12, 14 shown in FIG. 1; 32, 34 shown in FIG. 7; 42, 44 shown in FIG. 8; 52, 54 shown in FIG. 9; 62, 64 shown in FIG. 10; and 72, 74, 76 shown in FIG. 11 are unitary structures, as aforenoted. That is to say, these structures are formed as single pieces as by die casting, metal injection molding, powder metallurgy techniques, or by plastic molding techniques, as the case may be, depending upon size, tolerance and material requirements. In the preferred embodiment of the invention the support structures are of a suitable corrosion resistant steel and are fabricated by metal injection molding.

These methods of fabricating the support structures provide sufficient quality and dimensional control so that generally few, if any finishing operations are required prior to assembly of springs 16 and 18. In other words, the methods for forming the support structures as described provide said structures with near net shape geometry as will be recognized as desirable. The flexibility thereby achieved allows for infinite flex pivot mounting and a variety of modification possibilities including reduced or expanded internal diameters, slotting, threading, cut-out external diameters, shorter or longer lengths, key ways, flanges, etc. Both cantilevered and double ended flex pivots as herein shown and described can be fabricated using these techniques for forming the respective support structures.

Thus, pre-formed support structures are achieved which eliminate the need for core quadrants, outer sleeves and most of the labor intensive operations, including assembly and undercutting of a core assembly or sleeve that have heretofore been necessary. As a result, extensive cost savings are realized and the application of flex pivots to heretofore unavailable fields is now feasible. Further, by eliminating the quadrants and the sleeves as aforenoted, the pre-formed support structures eliminate the quadrant/sleeve brazed joints so as to render the assembled flex pivot more tolerant to vibration and shock loading, as has not heretofore been the case.

Springs 16 and 18 are constructed from a suitable material such as, for example, a corrosion resistant steel. This material may be pre-rolled to finished thickness dimensions and may be in the form of strips, rolls or plates. In the preferred embodiment of the invention strip stock is used.

A suitable braze material is first applied to the strip stock. This may be accomplished via electroplating or via a pre-mixed alloy laminated as foil onto the strip stock. In either case, and in the preferred embodiment of the invention, the braze material consists of a larger percentage of silver, a smaller percentage of copper and very small amounts of nickel. Other braze materials may be used as particular applications indicate, the same being within the spirit and scope of the invention.

In the preferred embodiment of the invention, forming of springs 16 and 18 from the braze prepared stock is accomplished by stamping. However, other methods, such as fine blanking, can be used. Stamping and fine blanking methods provide sufficient quality and dimensional control so that no additional operations are required prior to insertion of the springs into the diametrically opposed slots in the respective support structures.

Assembly of the springs into the support structures requires that the diametrically opposed slots of the support structures be slightly wider than the thickness of the spring material. This is necessary to accommodate the increased thickness of the springs due to the plated or laminated braze material as will be readily understood.

The assembled flex pivots, i.e. flex pivots with springs 16 and 18 inserted into the diametrically opposed slots of the respective support structures, includes fixturing the assembly and then subjecting the fixtured assembly to thermal conditions for performing braze and heat treating functions and/or a combination thereof. The thermal conditions are achieved via an oven brazing technique with temperature for brazing and heat treating cycles being in the range of 1800-1860 degrees F. for fifteen to fifty minutes, depending on the type of braze material used and the heat treatment required.

Subsequent finishing operations of the flex pivot assembly may be required to insure specified dimensions or to accommodate design modifications. If this is the case, the assembled flex pivots can be filled with a suitable compound, such as a wax, to prevent the pivots from flexing during the finishing operations.

It will be understood that the disclosed method may be changed to allow for various metallic, non-metallic and metallic/non-metallic flex pivot configurations while still coming within the spirit and scope of the invention. For example, the brazing process heretofore described is used for a metallic flex pivot but may be replaced with an adhesive or fusing process when plastic components are involved.

A flex pivot configured and fabricated in accordance with the invention as described can be used in any application requiring limited pivotal (oscillating) motion. Due to its configuration, the flex pivot so provided is much more tolerant to vibration and shock loading than would otherwise be the case. It will also be recognized that the flex pivot has a higher load rating when the springs are loaded in the tensile direction then flex pivots with the referenced quadrant/sleeve type construction.

In summary, the configuration and method for fabricating a flex pivot in accordance with the present invention provides a pivot having a much higher tolerance to vibration and shock loading than pivots provided by previous configurations and methods. The invention eliminates quadrant/sleeve braze joint failures associated with dynamic loads imposed upon pivots subjected to excessive vibration and shock conditions. Lower manufacturing costs result which allows the penetration of flex pivot technology into previously inaccessible markets.

With the above description of the invention in mind, reference is made to the claims appended hereto for a definition of the scope of the invention.

What is claimed is:

1. A method for fabricating a multi-piece flexural pivot comprising:
   forming first and second support structures as unitary structures so that each of said unitary structures has an outer portion with a diametrical opening extending therethrough and a reduced diameter arcuate portion extending therefrom and a pair of diametrically opposed slots extending in the opening and in the arcuate portion;
   applying a braze material to a strip of flexural material;
   forming first and second flexural members from the flexural material having the braze material applied thereto so that said first flexural member has a solid center and said second flexural member has an open center;
   inserting the solid center of the first flexural member in the open center of the second flexural member for providing a flexural assembly;
   disposing the first and second unitary support structures so that the reduced diameter arcuate portion of the first structure extends in the diametrical opening of the second structure and the reduced diameter arcuate portion of the second structure extends in the diametrical opening of the first structure;
   disposing the flexural assembly so that the first and second flexural members engage the diametrically opposed slots in the openings and in the arcuate portions of the first and second structures to provide a pivot assembly; and
   exposing the pivot assembly to a thermal environment for brazing the flexural assembly in the diametrically opposed slots to provide a flexural pivot permitting relative pivotal displacement between the first and second support structures.

2. A method for fabricating a multi-piece flexural pivot as described by claim 1, wherein forming first and second support structures as unitary structures includes:
   forming the first and second support structures so that said structures have near net shape geometry.

3. A method for fabricating a multi-piece flexural pivot as described by claim 2, wherein forming the first and second support structures so that said structures have near net shape geometry includes:
   metal injection molding the support structures.

4. A method for fabricating a multi-piece flexural pivot as described by claim 1, wherein applying a braze material to a flexural material includes:
   electroplating the braze material to a strip of flexural material.

5. A method for fabricating a multi-piece flexural pivot as described by claim 1, wherein forming first and second flexural members from the flexural material having the braze material applied thereto includes:
   Stamping the first and second flexural members from a strip of flexural material having the braze material applied thereto.

6. A method for fabricating a multi-piece flexural pivot as described by claim 4, including:
   stamping the first and second flexural members from a strip of flexural material having the braze material electroplated thereon.

7. A method for fabricating a multi-piece flexural pivot as described by claim 1, wherein forming the first and second support structures as unitary structures includes;
   forming the diametrically opposed slots so that said slots are slightly wider than the thickness of the first and second flexural members for accommodating the increased thickness of said flexural members due to the application of the braze material.

8. A method for fabricating a multi-piece flexural pivot as described by claim 1, wherein exposing the pivot assembly to a thermal environment for brazing the flexural assembly in the diametrically opposed slots includes:
   fixturing the pivot assembly; and
   oven brazing the fixtured pivot assembly.

9. A method for fabricating a multi-piece flexural pivot as described by claim 5, wherein:
   the oven brazing duration and temperature range are selected for heat treating the pivot assembly.

10. A method for manufacturing a multi-piece flexural pivot as described by claim 1, including:
    filling the flexural pivot with a suitable material to prevent flexing; and
    performing finishing operations on the filled flexural pivot to insure specified net geometry.

11. A method for fabricating a multi-piece flexural pivot comprising:
    forming first and second support structures as unitary structures so that each of said first and second unitary structures has an outer portion with a diametrical opening extending therethrough and a reduced diameter arcuate portion extending therefrom, and a pair of diametrically opposed slots extending in the opening and in the arcuate portion;
    forming a third structural support as a unitary structure having an outer portion with a diametrical opening extending therethrough and oppositely disposed reduced diameter arcuate portions extending therefrom, and having diametrically opposed slots extending in the arcuate portions;
    applying a braze material to a flexural material;
    forming first and second flexural members from the flexural material having the braze material applied thereto so that said first flexural member has a solid center and said second flexural member has an open center;
    inserting the solid center of the first flexural member in the open center of the second flexural member for providing a flexural assembly;
    disposing the first, second and third unitary support structures so that their reduced diameter arcuate portions extend in the diametrical opening of the third unitary support structure, and the oppositely disposed reduced diameter arcuate portions extending from said third unitary support structure extend in the diametrical openings of the first and second unitary support structures;
    disposing the flexural assembly so that the first and second flexural members engage the diametrically opposed slots in the first, second and third unitary support structures to provide a pivot assembly; and
    exposing the pivot assembly to a thermal environment for brazing the flexural assembly in the diametrically opposed slots to provide a flexural pivot permitting relative pivotal displacement between the first, second and third unitary support structures.

12. A method for fabricating a multi-piece flex pivot as described by claim 11, wherein forming the first, second and third support structures as unitary structures includes:

forming the first, second and third support structures so that said structures have near net shape geometry.

13. A method for fabricating a multi-piece flex pivot as described by claim 12, wherein forming the first, second and third support structures so that said structures have near net shape geometry includes:

metal injection molding the support structures.

14. A method for fabricating a multi-piece flexural pivot as described by claim 11, wherein forming first and second flexural members from the flexural material having the braze material applied thereto includes:

stamping the first and second flexural members from a strip of flexural material having the braze material applied thereto.

15. A method for fabricating a multi-piece flexural pivot comprising:

forming a plurality of support structures as unitary support structures so that each of said plurality of support structures has portions for mating with portions of the others of the plurality of support structures, and arranging said plurality of support structures for retaining a flexural assembly;

applying a braze material to a flexural material and forming a flexural assembly therefrom;

disposing the plurality of support structures so that the mating portions thereof mate;

disposing the flexural assembly having the brazed material applied thereto for retaining said assembly by the plurality of support structures and for providing a pivot assembly; and exposing the pivot assembly to a thermal environment for brazing the flexural assembly to the plurality of support structures and for providing a flexural pivot permitting relative pivotal displacement between the plurality of support structures.

16. A method for fabricating a multi-piece flexural pivot as described by claim 15, wherein forming a plurality of support structures as unitary structures includes:

forming the first, second and third support structures so that said structures have near net shape geometry.

17. A method for fabricating a multi-piece flexural pivot as described by claim 16, wherein forming the first, second and third support structures so that said structures have near net shape geometry includes:

metal injection molding the support structures.

18. A method for fabricating a multi-piece flexural pivot as described by claim 15, wherein applying a braze material to a flexural material and forming a flexural assembly therefrom includes:

applying a braze material to a strip of flexural material;

stamping a plurality of flexural members from the flexural material having the braze material applied thereto; and arranging said flexural members relative to each other for forming the flexural assembly.

19. A method for fabricating a multi-piece flexural pivot as described by claim 15, wherein:

exposing the pivot assembly to a thermal environment for brazing the flexural assembly to the plurality of support structures includes:

fixturing the pivot assembly; and oven brazing the fixtured pivot assembly.

20. A method for fabricating a multi-piece flexural pivot as described by claim 19, wherein:

the oven brazing duration and temperature range are selected for heat treating the pivot assembly.

* * * * *